(12) United States Patent
Dohmann et al.

(10) Patent No.: US 9,434,100 B2
(45) Date of Patent: Sep. 6, 2016

(54) DEVICE FOR SEALING A COOLING TANK FOR AN EXTRUDED PLASTIC PROFILE

(75) Inventors: Heinrich Dohmann, Hoexter (DE);
Thomas Gesper, Guetersloh (DE)

(73) Assignee: BATTENFELD-CINCINNATI GERMANY GMBH, Bad Oeynhausen (DE)

(*) Notice: Subject to any disclaimer, the term of this patent is extended or adjusted under 35 U.S.C. 154(b) by 1158 days.

(21) Appl. No.: 13/508,376

(22) PCT Filed: Nov. 3, 2010

(86) PCT No.: PCT/EP2010/066721
§ 371 (c)(1),
(2), (4) Date: May 7, 2012

(87) PCT Pub. No.: WO2011/054855
PCT Pub. Date: May 12, 2011

(65) Prior Publication Data
US 2012/0273992 A1 Nov. 1, 2012

(30) Foreign Application Priority Data

Nov. 6, 2009 (DE) .......................... 10 2009 046 510

(51) Int. Cl.
*B29C 47/90* (2006.01)
*B29C 47/00* (2006.01)
*B29C 47/88* (2006.01)
*B29C 47/92* (2006.01)
(Continued)

(52) U.S. Cl.
CPC ......... *B29C 47/903* (2013.01); *B29C 47/0092* (2013.01); *B29C 47/8835* (2013.01);
(Continued)

(58) Field of Classification Search
CPC ............ B29C 47/009; B29C 47/0092; B29C 47/0808; B29C 47/8815; B29C 47/8835; B29C 47/903; B29C 47/905; B29C 47/907
See application file for complete search history.

(56) References Cited

U.S. PATENT DOCUMENTS 2,446,620 A   8/1948   Swallow et al.
3,352,563 A   11/1967  Flair
(Continued)

FOREIGN PATENT DOCUMENTS

| DE | 1032710 B | 6/1958 |
|---|---|---|
| DE | 102005028087 A1 | 12/2006 |
| DE | 102008050227 A1 | 4/2010 |
| DE | 102008050228 A1 | 4/2010 |
| GB | 922504 A | 4/1963 |

OTHER PUBLICATIONS

European Patent Office, International Search Report in International Patent Application No. PCT/EP2010/066721 (Mar. 4, 2011).

*Primary Examiner* — Yogendra Gupta
*Assistant Examiner* — Joseph Leyson
(74) *Attorney, Agent, or Firm* — Leydig, Voit & Mayer, Ltd.

(57) ABSTRACT

A device for sealing an extruded plastics material profile in at least one of an inlet region and an outlet region of a tank is disposed at an end face of the tank. The device includes a rigid element and a closed annular cross section formed of a resilient material and including a cavity. An outer peripheral shape of the annular cross section is disposed against the rigid element. The annular cross section is alterable by applying a vacuum to the cavity, wherein the annular cross section is configured to be applied to an outside of the plastics material profile. A stretching device is disposed against the rigid element and is configured to stretch the resilient material along an extrusion axis during an alteration of the annular cross section.

7 Claims, 4 Drawing Sheets

(51) Int. Cl.
   *B29C 47/08* (2006.01)
   *B29L 23/00* (2006.01)

(52) U.S. Cl.
   CPC ............ *B29C47/905* (2013.01); *B29C 47/907* (2013.01); *B29C 47/92* (2013.01); *B29C 47/003* (2013.01); *B29C 47/0057* (2013.01); *B29C 47/0808* (2013.01); *B29C 47/8805* (2013.01); *B29C 47/8815* (2013.01); *B29C 2947/92514* (2013.01); *B29C 2947/92619* (2013.01); *B29K 2995/007* (2013.01); *B29L 2023/00* (2013.01)

(56) References Cited

U.S. PATENT DOCUMENTS

| | | | | |
|---|---|---|---|---|
| 3,509,890 | A | * | 5/1970 | Phillips ................ F16J 15/3228 134/122 R |
| 4,171,193 | A | * | 10/1979 | Rahlfs .................... B29C 47/38 264/40.7 |
| 4,247,271 | A | * | 1/1981 | Yonekura .............. B29C 35/065 264/236 |
| 4,626,183 | A | | 12/1986 | Shirai et al. |

\* cited by examiner

DEVICE FOR SEALING A COOLING TANK FOR AN EXTRUDED PLASTIC PROFILE

CROSS-REFERENCE TO PRIOR APPLICATIONS

This application is a U.S. National Phase application under 35 U.S.C. §371 of International Application No. PCT/EP2010/066721, filed on Nov. 3, 2010, and claims benefit to German Patent Application No. DE 10 2009 046 510.3, filed on Nov. 6, 2009. The International Application was published in German on May 12, 2011 as WO 2011/054855 A1 under PCT Article 21(2).

FIELD

The invention relates to a device for sealing an extrudate to the inside of a tank while said extrudate passes through the tank during calibration, the device being arranged on the end face of the tank and having an annular cross section which can be applied against the end face of the plastics material profile.

BACKGROUND

Devices are adapted in each case to specific extrudates and cannot be used universally. Particularly during the extrusion of pipes which merely vary in diameter, this change of device entails an unnecessary additional amount of time and thus an increase in the downtime of the plant.

SUMMARY OF THE INVENTION

In an embodiment, the present invention provides a device for sealing an extruded plastics material profile in at least one of an inlet region and an outlet region of a tank and disposed at an end face of the tank. The device includes a rigid device and an annular cross section being closed and including a cavity and a resilient material. An outer peripheral shape of the annular cross section is disposed against the rigid device such that the annular cross section is alterable on a surface part associated with a center axis of the annular cross section by applying a vacuum to the cavity, wherein the annular cross section is configured to be applied to an outside of the plastics material profile. A stretching device is disposed against the rigid device and configured to stretch the resilient material to a greater or a lesser extent along an extrusion axis during an alteration of the annular cross section.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
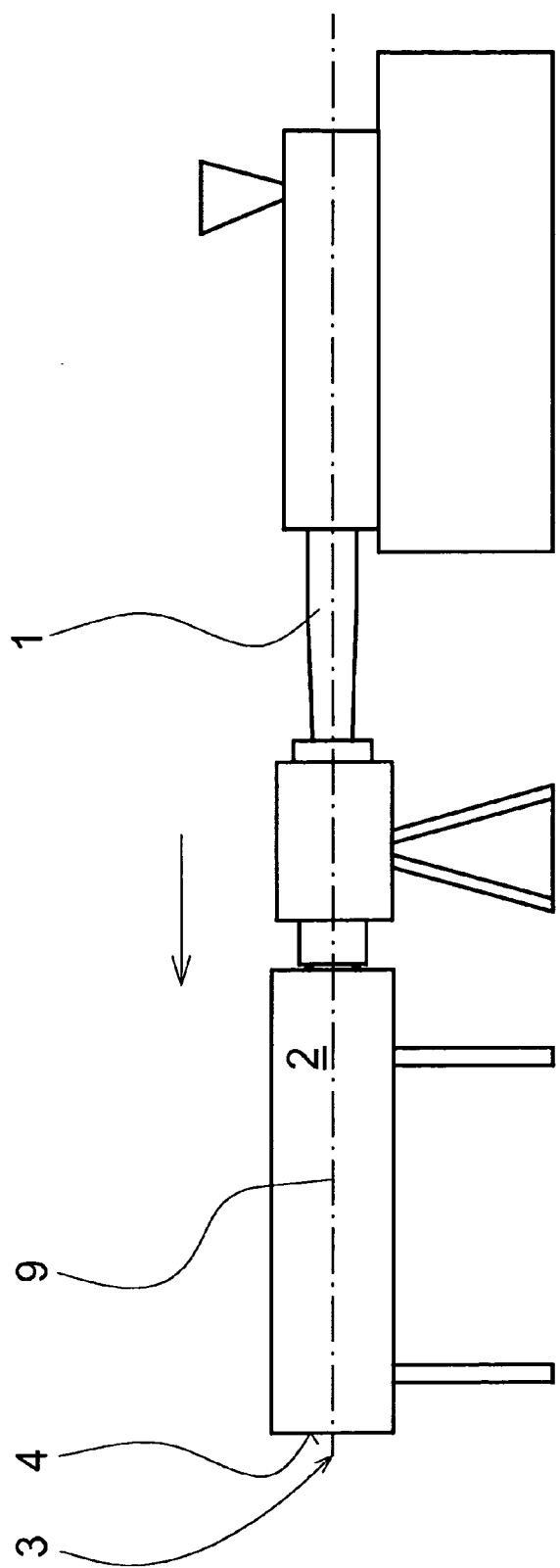
FIG. 1 shows part of an extrusion line.

In an embodiment, the present invention provides a device and a corresponding method, which device makes it possible to adapt the used seal to different extrudates.

In an embodiment, the device is characterised in that the annular cross section is closed and has a cavity, the annular cross section being formed from a resilient material and being arranged with its outer peripheral shape on a rigid device, and the annular cross section can be altered in the cavity by applying a vacuum, and the alteration in cross section, due to the rigid device arranged on the outer periphery of the annular cross section, can only be carried out on the surface parts associated with the centre axis of the annular cross section and, during alteration of the cross section, the resilient material can be stretched to a greater or lesser extent along the extrusion axis by a stretching means arranged against the rigid device.

This configuration of the device provides a seal with respect to the pipe and thus ensures the tightness with respect to the vacuum and calibration tank. Changes in diameter of the pipe are easily detected over a large area. The facility of stretching the resilient material to a greater or lesser extent rules out the formation of folds in the annular cross section and thus also rules out unsightly marks on the surfaces of the pipes.

According to an embodiment, the stretching means is connected to guide rods, thus allowing a simple realisation of the greater or lesser stretching of the resilient material. In a further development, springs are provided on the guide rods so that a minimum tension is always applied to the resilient material. Of course, this adjustment can also be carried out by electric, pneumatic or hydraulic means. A control of this type is advantageously connected to the control of the extruder line so that specifications for the device can already be stored in the extruder line control and the device can be controlled centrally.

According to a further embodiment, the cavity in the annular cross section is filled with air or water. The measure of filling with a fluid also influences the sealing behaviour on the outer wall of the pipe due to the hydrostatic pressure, and this can be advantageous in the choice of a predetermined shape of the resilient material. The predetermined shape can provide different cross sections of the profile to be extruded or can influence the outer surface of the pipe.

At least one region of the resilient material is configured such that it is relatively wear-resistant. This can be achieved, for example by vulcanising in graphite during the production of the resilient material. Likewise, it is possible to integrate fabric threads or a fabric web. As a result, the surfaces which are particularly loaded, namely the surfaces along which the extruded pipe slides are made to be more resistant to wear, thus increasing the service life of the entire device.

The device according to an embodiment of the invention can be used in the case of a vacuum calibration tank, but equally just for a cooling tank or for a combination of both.

In an embodiment of the invention, a method is characterised in that an external pressure acts on the annular cross section and an internal pressure prevails inside the annular cross section, in the cavity, and when the external pressure and the internal pressure are the same, the smallest passage cross section is formed, the passage cross section being enlarged as the difference of pressure between the external pressure and the internal pressure increases and the resilient material is stretched to a greater or lesser extent along the extrusion axis as a function of the difference of pressure.

Thus, it is provided that a hollow annular cross section is configured in its basic position (i.e. the hollow annular cross section assumes its geometric position without external influence, which means, for example, the effect of all types of forces) such that it rests against the outer wall of the plastics material pipe and thus has the smallest passage cross section. The pressure acting from outside on the annular cross section is equal to the internal pressure in the cavity. Therefore, under normal conditions, in the initial state this would be substantially atmospheric pressure.

In an embodiment, to alter the clear passage cross section for a profile, the annular cross section is evacuated, thus producing a difference of pressure between external pressure and internal pressure, as a result of which the annular cross section is pulled away from the outer wall of the profile and the passage cross section widens. To make this easier, the outer peripheral shape should be fixedly attached to a further rigid suspension. This rigid suspension can be, for example, a cylinder which is arranged on the tank by a flange. The resilient material can form the cavity together with this suspension or can be arranged on the suspension like a bicycle tube.

The annular cross section can also be subjected to slight excess pressure so that the region of the diameter adaptation can be configured to be larger. A difference of pressure between internal pressure and external pressure would then be present and the resilient material would be slightly stretched, still with no folds forming on the annular cross section.

Evacuation of the annular cross section increases the passage cross section, although the cavity in the annular cross section itself is reduced. Since the resilient material cannot be compressed, but it is to be prevented from forming folds for example, it is stretched along the extrusion axis by a suitable device. The precise mode of operation is outlined in the description of the figures.

When plastics material profiles are extruded, the plastics material strand which is produced has to be kept in the desired shape after moulding until it has fallen below a temperature range and is dimensionally stable without a support and the natural material shrinkage has substantially ended. For this purpose, a vacuum tank is generally used through which the profile passes. The proposed device serves to seal off the inside of the vacuum tank in which a vacuum prevails and to seal off the surroundings under normal pressure.

FIG. 1 shows part of an extrusion line, reference only being made here to the end of the vacuum tank. The extrusion direction is indicated by the arrow and the entire line extends along the extrusion axis 9. Further follow-on devices, such as offtake and saw can be connected to the vacuum tank 2 (i.e. in the direction of the arrow). Located upstream of the tank (i.e. against the direction of the arrow) are extruder, extrusion die and calibration. Extending along this extrusion axis is the extruded profile 1 which passes through all the stations of the extrusion line.

The device according to the invention is arranged at the end face 4 of the vacuum tank 2 and is thus located in the outlet region 3 of the vacuum tank 2. Of course, it can also be similarly arranged in the inlet region.

This device consists of a filled annular cross section, the annular cross section being formed by a cylinder 7 and a resilient material 6 which can be a rubber hose or the like. This annular cross section shown in a sectional view in FIG. 2, the section goes along the extrusion axis, is arranged around the centre axis and extrusion axis 9 and is filled completely with a fluid in the form of air or water and rests against the outer wall 5 of the plastics material profile 1. The resilient material 6 is therefore in a relaxed state and does not form any folds, kinks or the like. It is locked with the end face 4 of the tank by a flange 11 fitted on the rigid device 7 on the side associated with the tank 2 and is thus fixed thereto.

On the side remote from the tank 2, the resilient material 6 is also clamped or fixed in another manner in a stretching means 12. The stretching means 12 is displaceably arranged inside the rigid device, here in the form of a cylinder 7. The cylinder 7 and the bilaterally clamped and fixed resilient material 6 thus form a variable cavity 16; it is formed by the cylinder wall and the surfaces 10, 19 and 20 of the resilient material. However, as described above, it could also be a closed annular cross section (bicycle tube) which is arranged on the cylinder 7. The partial annular surface 10 determines the passage cross section 17. If a larger passage cross section is required, the cavity 16 is evacuated. Since a resilient material is concerned, only this can be evacuated and not the cylinder 7. When looking at the pure superficial section line of the surfaces 10, 19 and 20 of the resilient material according to FIG. 2, it can be seen that the entire stretched length would have to become shorter when the passage cross section 17 is enlarged by evacuation. Of course, since this is impossible, provision is made to perform a stretching in the extrusion direction by the stretching device 12, to which the resilient material 6 is connected. Thus, the angle α, present in this section, between the two surfaces 19 and 20 is increased.

The stretching device 12 is connected to guide rods 13 which, in turn, are kept pretensioned by springs 14. As a result of this configuration, the entire device can be controlled by the evacuation alone. By evacuating the annular cross section and thus as a result of the ensuing alteration of the cavity 16, the stretched length, described above, of the resilient material 6 required for forming the cavity 16 is reduced. Due to the spring loading of the guide rods 13, the stretching means 12 is pulled away, i.e. away from the tank, in the extrusion direction. Of course, the spring constant of the installed springs is coordinated with the resilience of the resilient material 6, so that the resilient material 6 is not pulled away from the profile without evacuation having taken place.

Therefore, the filling inside the annular cross section is minimised and thus the annular cross section is evacuated, thereby enlarging the free passage cross section. The annular cross section can thus be universally adapted to different diameters of profiles or pipes.

The positioning of the resilient material 6 against the outer wall 5 of the profile 1 can be furthered by one or more resilient rings. These rings counteract the evacuation force and thus press the resilient material onto the outer wall 5.

Figure 2:
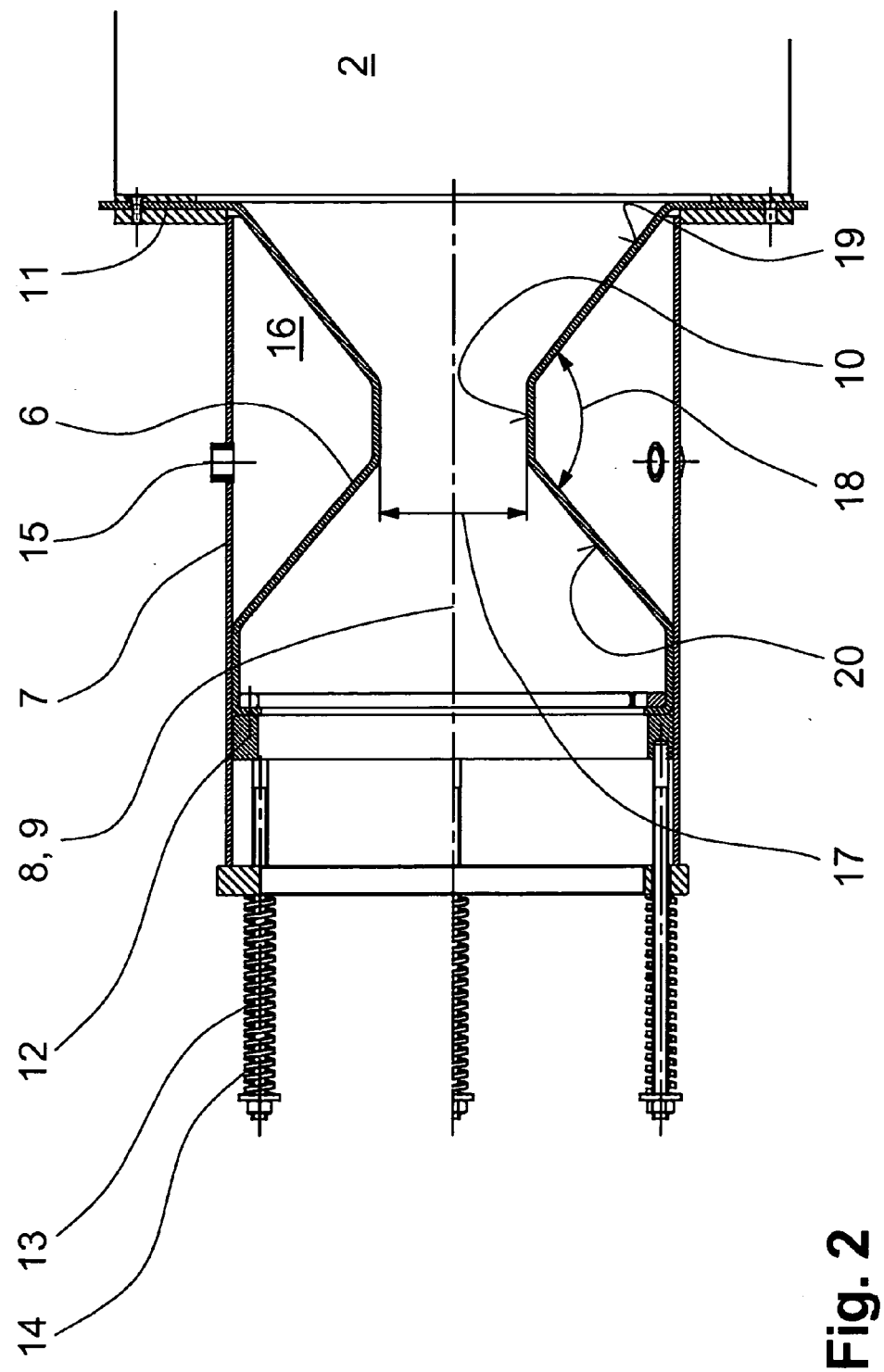
FIG. 2 is a sectional view through the device according to an embodiment of the invention.
Figure 3:
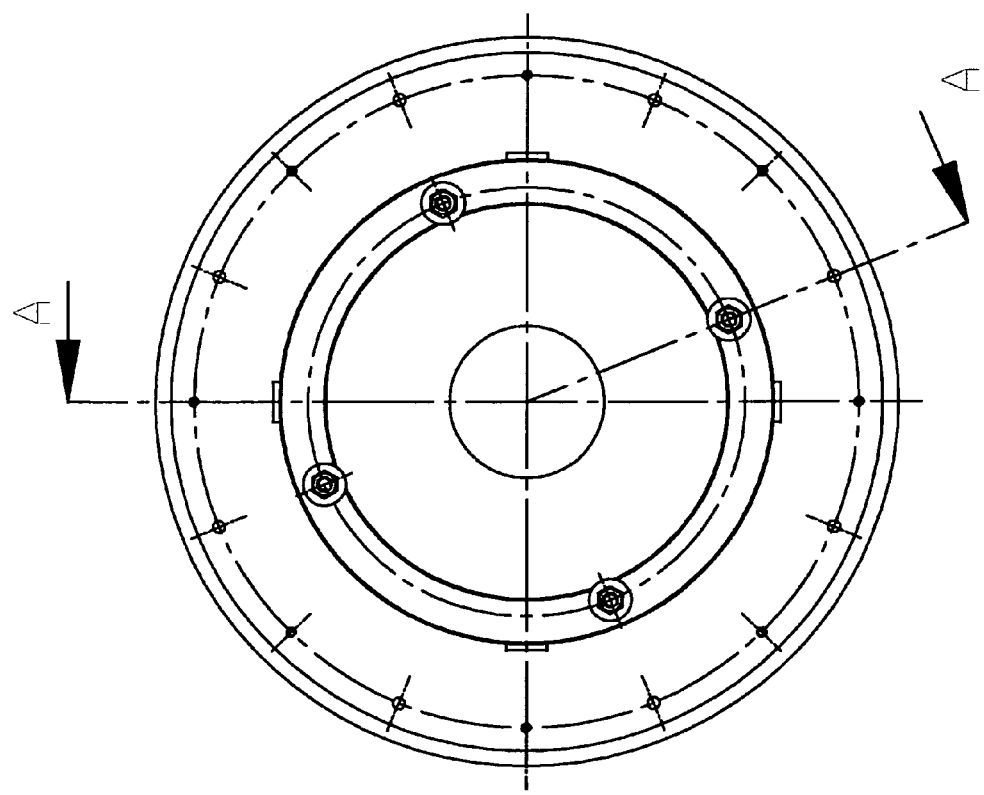
FIG. 3 is a front view and FIG. 4 is a perspective view of the section according to FIG. 2.
Figure 4:
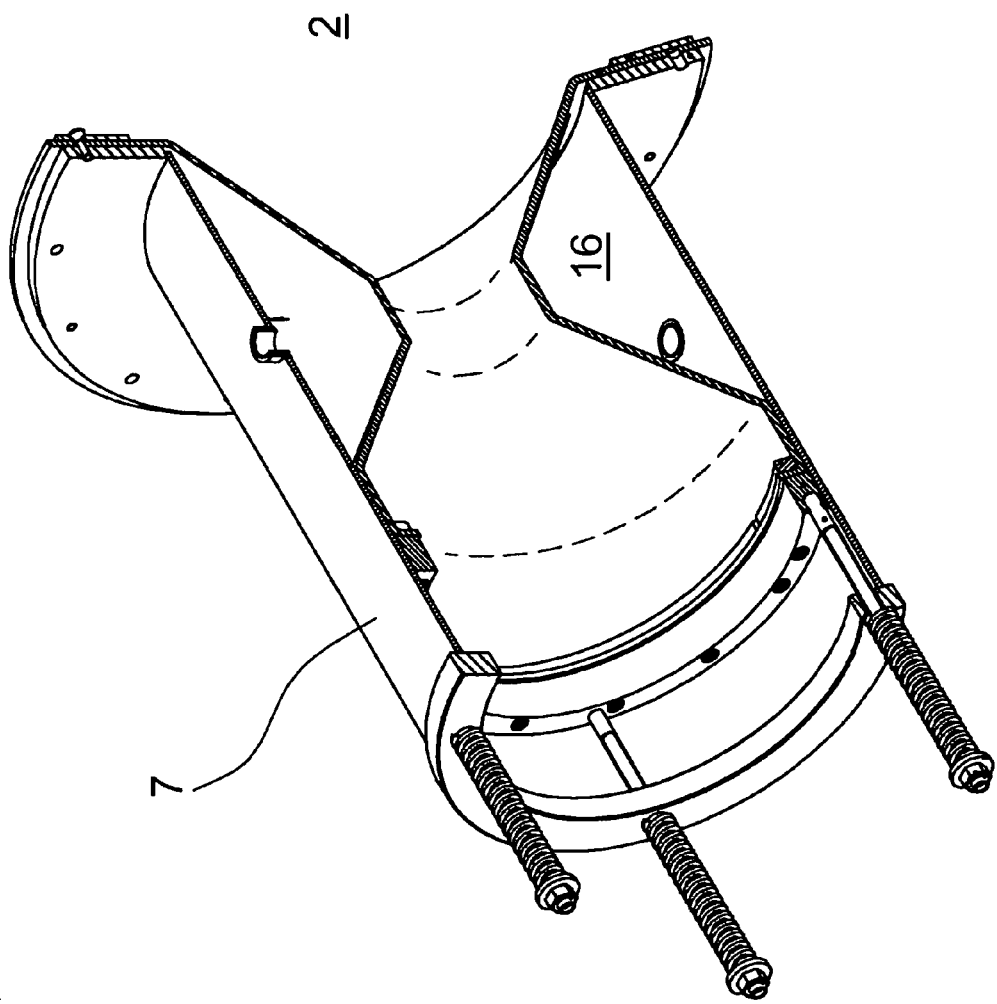

FIG. 3 is a side view of the device, identifying the path of the sectional view of FIGS. 2 and 4.

FIG. 4 is a perspective view of the configuration according to FIG. 2, so that reference is made to the description of FIG. 2 and the reference signs used therein have also been used in FIG. 4.

The alteration of the passage cross section 17 which is described above and is achieved by evacuating the cavity 16 and moving the stretching means 12 to enlarge the passage cross section 17 can naturally also be reversed. If a passage cross section 17 which has once been enlarged is to be made smaller again, the applied vacuum is minimised, as a result of which the alterable cavity 16 is again increased in the annular cross section and it reduces the passage cross section 17 which is formed by the partial surfaces 10 of the resilient material. The required increase in resilient material 6 is provided by moving the stretching means 12, now against the extrusion direction, since the springs 14 are flexible.

To minimise wear, the resilient material can be reinforced in a suitable manner, particularly in the region of the surface 10. As described above, graphite or graphite particles or fabric are suitable to be incorporated by vulcanisation.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

1 profile
2 tank
3 outlet region of 2
4 end face of 2
5 end face of 1
6 resilient material
7 rigid device
8 centre axis
9 extrusion axis
10 surface parts of 6
11 flange of 7
12 stretching means in 7
13 guide rod
14 spring
15 valve opening
16 cavity
17 variable diameter
18 surface of 6
19 further surface of 6
α angle between 19 and 20
p1 external pressure
p2 internal pressure

The invention claimed is:

1. A device for sealing an extruded plastics material profile in at least one of an inlet region and an outlet region of a tank and disposed at an end face of the tank, the device comprising:
   a rigid element;
   a closed annular cross section formed of a resilient material and including a cavity, wherein an outer peripheral shape of the annular cross section is disposed against the rigid element, wherein the annular cross section is alterable by applying a vacuum to the cavity and wherein the annular cross section is configured to be applied to an outside of the plastics material profile; and
   a stretching device disposed against the rigid element and configured to stretch the resilient material along an extrusion axis during an alteration of the annular cross section, the stretching device comprising a plurality of guide rods, each guide rod including a spring coiled around the guide rod so as to tension each of the plurality of guide rods.

2. The device as recited in claim 1, wherein a control of the stretching device is connected to a central control of an extruder line.

3. The device as recited in claim 1, wherein the cavity is filled with a fluid.

4. The device as recited in claim 3, wherein the fluid includes one of air and water.

5. The device as recited in claim 1, wherein the tank is at least one of a calibration tank and a cooling tank.

6. The device as recited in claim 1, wherein the resilient material includes a predetermined shape.

7. The device as recited in claim 1, wherein the resilient material includes at least one region configured to minimize wear.

\* \* \* \* \*